Aug. 19, 1969   R. A. LYBARGER   3,461,532
WIRE BEADER
Filed May 24, 1965   3 Sheets-Sheet 1
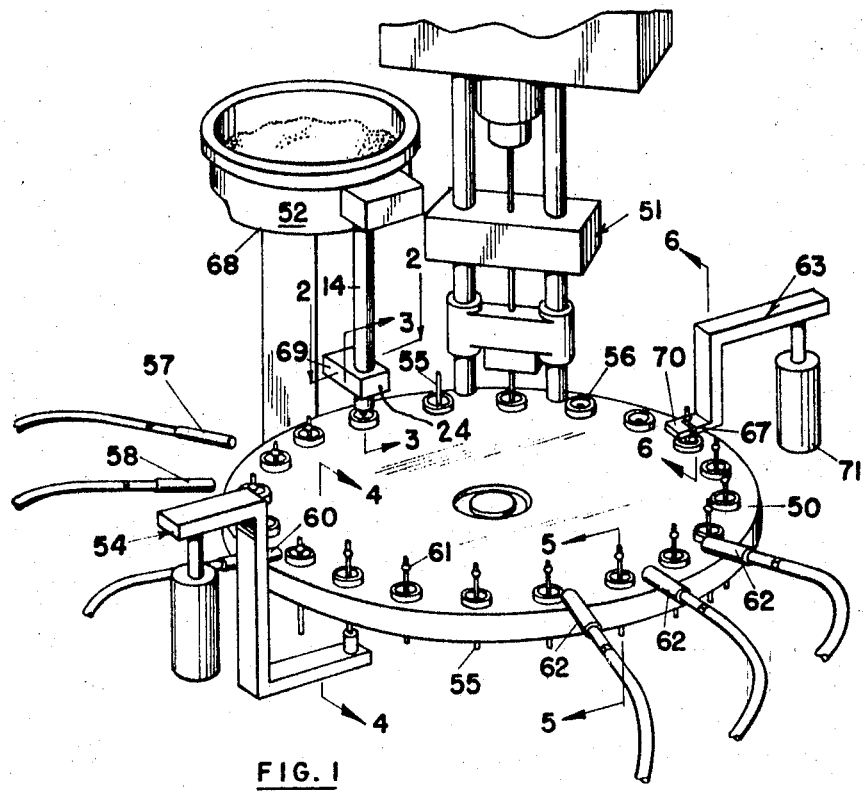
FIG. 1
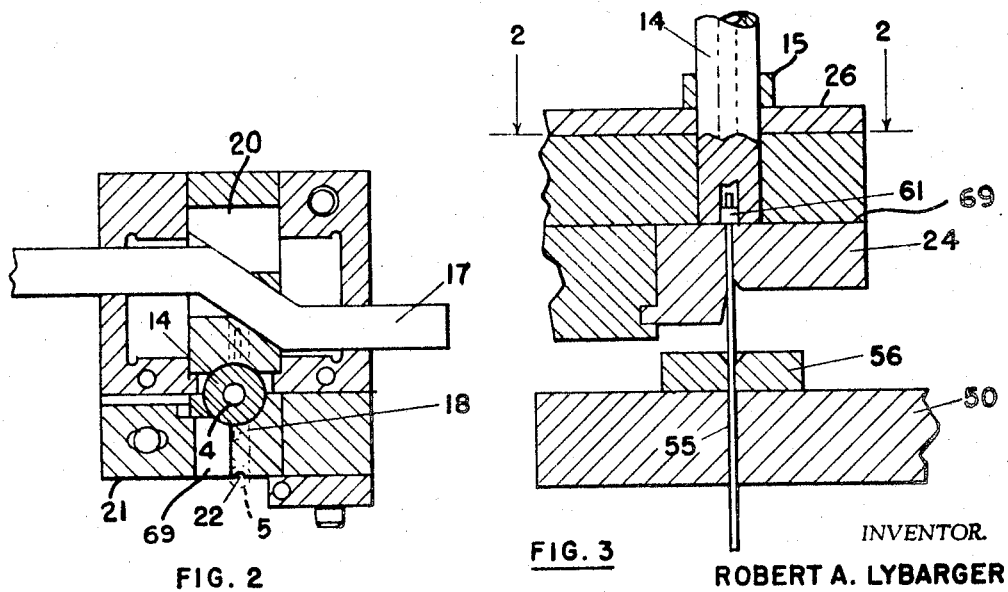
FIG. 2
FIG. 3
INVENTOR.
ROBERT A. LYBARGER
BY
Charles L. Lovercheck
attorney Aug. 19, 1969     R. A. LYBARGER     3,461,532
WIRE BEADER Filed May 24, 1965     3 Sheets-Sheet 2

INVENTOR.
ROBERT A. LYBARGER
BY Charles L. Lovercheck
attorney

Aug. 19, 1969  R. A. LYBARGER  3,461,532
WIRE BEADER

Filed May 24, 1965  3 Sheets-Sheet 3

INVENTOR.
ROBERT A. LYBARGER
BY Charles L. Lovercheck
attorney ated Aug. 19, 1969

3,461,532
WIRE BEADER
Robert A. Lybarger, Saegertown, Pa., assignor to Glass-Tite Industries, Inc., Providence, R.I., a corporation of Rhode Island
Filed May 24, 1965, Ser. No. 458,031
Int. Cl. B23p *19/04;* B23q *17/10*
U.S. Cl. 29—203                                                9 Claims

ABSTRACT OF THE DISCLOSURE

The invention disclosed herein is a bead loader wherein beads are fed from a feeder to a platform. The bead is moved over the platform to a position where the opening of the bead is over a slot which is aligned with the opening. The wire is pushed through the slot, up through the bead and the wire with the bead on it is then moved away from the platform. The bead may be sealed to the wire in any suitable manner.

---

This invention relates to assembly machines and, more particularly, to machines for assembling beads on wires or the like.

This machine is an improvement over the bead loader shown in Patent No. 3,124,861.

It is an object of the present invention to provide an improved bead loading machine for attaching beads to wires.

Another object of the invention is to provide a bead loading machine which is simple in construction, economical to manufacture, and simple and efficient in operation.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 1 is an isometric view of a machine according to the invention;

FIG. 2 is a cross sectional top view of the bead loader taken on line 2—2 of FIG. 1 and FIG. 3;

FIG. 3 is a cross sectional view of the bead loader taken on line 3—3 of FIG. 1;

Figure 7:
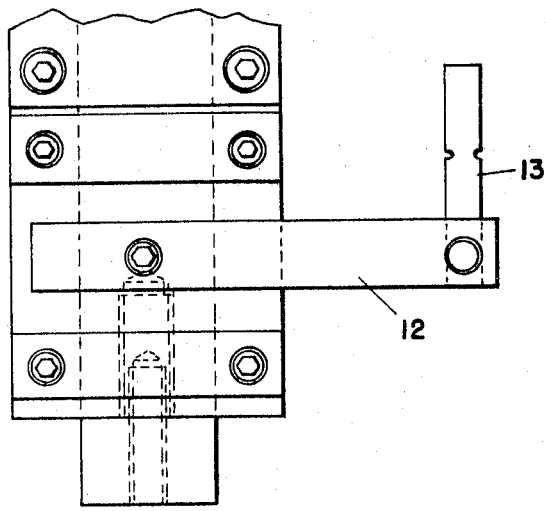
FIG. 7 is an enlarged view of the shuttle bead loader assembly.
Figure 4:
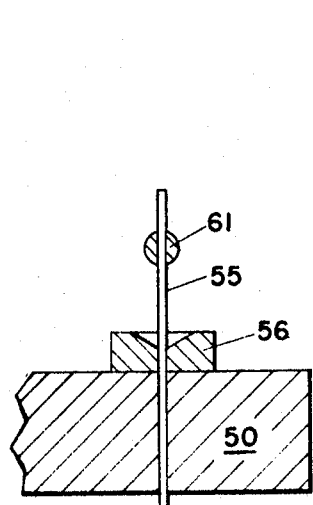
FIG. 4 is an enlarged cross sectional view of the push up device taken on line 4—4 of FIG. 1.

Now with more particular reference to the drawings, the machine shown in the several figures is made up generally of a table or turret 50 which carries rotating chucks 56 which, in turn, carry measured cut length of wire 55 which are to have beads sealed to them. Supported on the table are the measuring station 51, the bead loader station 52, the pick off station 63 which unloads the beaded wires, and the push up station 54.

Essentially, the wire is supported in the form of a roll. As the wire comes off the roll, it is cut off to measured lengths of wire 55 at the measuring station 51. The cut measured lengths of wire 55 are inserted in the rotating chuck 56 in the table and frictionally held in place. The table is indexed to bring the particular chucks 56 in sequence to position under the bead loader station 52 where a glass bead 61 is placed on each measured cut length of wire 55. The beaded leads are then moved from the bead loader station 52 past the gas burners 57 and 58 where the glass beads and wires are preheated and beads 61 are then tacked to the wires 55 by the gas burner 60 which has an oxygen supported gas flame to cause its flame to be hotter than the flame of gas burners at 57 and 58.

The wires 55 with the beads 61 are then moved up in chuck 56 at push up station 54 so that the bead can be heated away from the chucks and the chucks will not be damaged by the fire as they pass by the gas burners 62. As the beads 61 and wires 55 advance past burners 62, the beads are hermetically sealed to the wires 55. The beaded leads then move into fork 70 as the turret indexes and are then lifted from the chucks 56 by pickoff arm 53 which moves up and down in synchronism with the indexing of the table. After they are picked from the chucks 56, the beaded leads are dropped into a receptacle by a suitable transfer means.

The indexing movement of the table 50, the operation of the cutoff and measuring device 51, the beading operation at 52, and the pushup operation 54 are all synchronized by a suitable cam arrangement such as shown in Patent No. 3,124,861.

THE BEAD LOADER

The bead loader is made up of the mounting base 24 which has a top surface forming a platform over which the shuttle block 20 with its plunger 18 slides. The adjustable guide 21 has a slot 21' therethrough which is aligned with the slot plunger 18 and through which the plunger 18 moves. The shuttle block 20 is guided between the sides of the shuttle block housing 16. The chute 14 is attached to the cover plate 26 by means of the plug 15. Thus, bears are fed down through the chute 14 and as they drop onto the platform 69 on top of the base 24, they are moved individually into the position 5 from the position 4 by the shuttle block plunger 18. The shuttle block plunger 18 is moved backward and forward by the sliding cam 17 which reciprocates to the right and left to feed the beads individually.

Beads 61 are fed from the bead loader station 52 by a vibratory bowl feeder 68 in the preferred embodiment shown; however, the beads could be fed to the bead loader by any other suitable feeding means. The beads 61 are oriented by the feeder 68 so that the hole of each bead extends downwardly. The beads then pass down the tubular chute 14 and land on a platform 69 and form a column with their holes aligned with each other. The lowermost bead in the tubular chute 14 rests on the platform on top of nose piece 22. The lowermost bead is pushed laterally by the shuttle block plunger 18 which is reciprocated by the sliding cam 17. The sliding cam 17 is actuated by a suitable connection to a gang of cams under the table as in the aforesaid patent.

Figure 8:
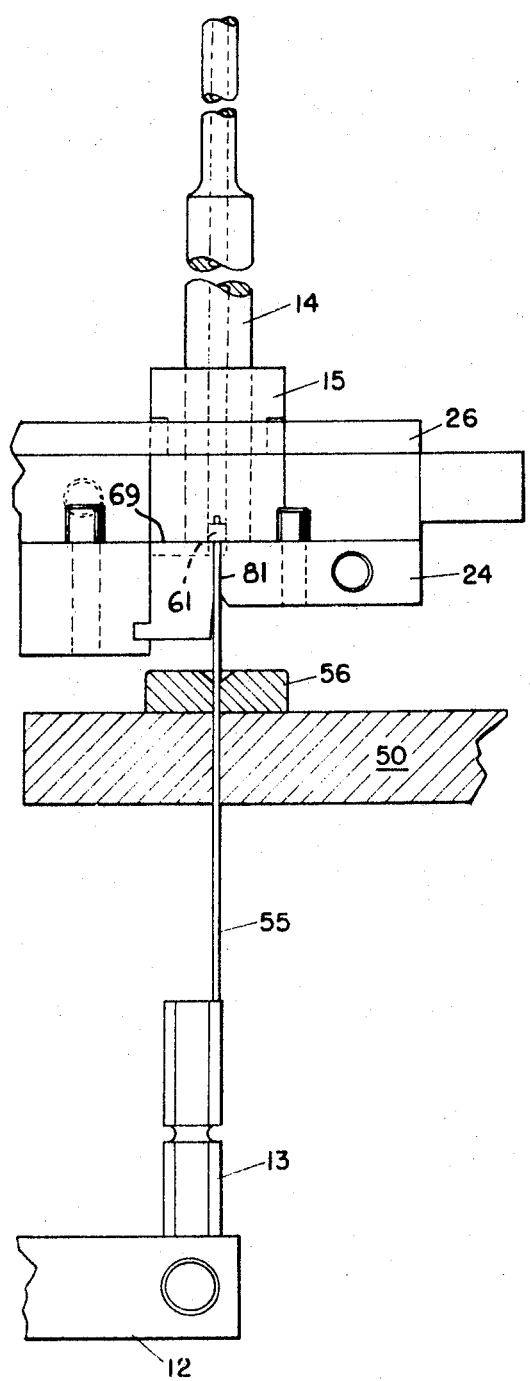
FIG. 8 is an enlarged view of the bead loader similar to FIG. 3.

When the bead is in position with its hole overlying notch 81 nose piece 22, the length of wire 55 is pushed up into the bead as shown in FIG. 8. The wire push up 13 is actuated by a wire push up arm 12 which is, in turn, connected to the cam arrangement under the table as aforesaid. Thus, the end of the wire is pushed up into the hole in the bead as the bead rests on the platform 69. The bead is then pulled from said slot and moved to an assembly position on the machine.

Figure 5:
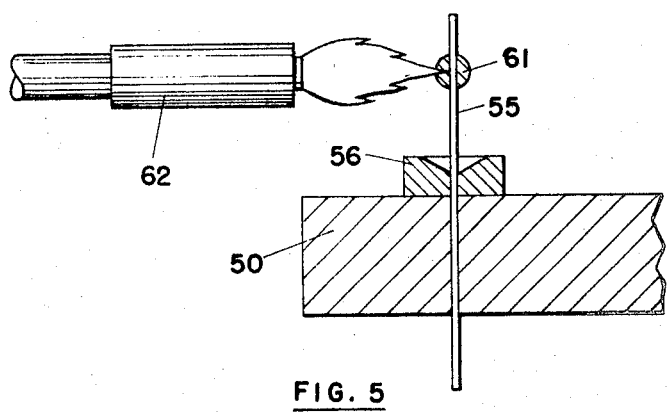
FIG. 5 is an enlarged cross sectional view taken on line 5—5 of FIG. 1.
Figure 6:
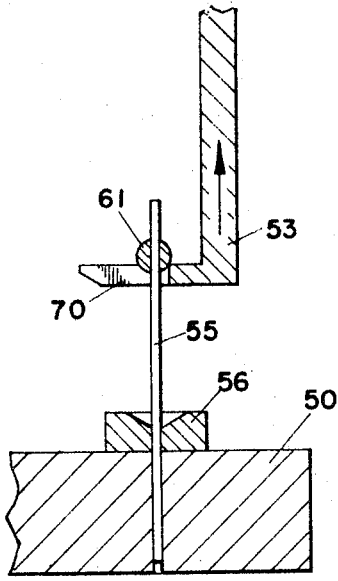
FIG. 6 is an enlarged cross sectional view taken on line 6—6 of FIG. 1.
Figure 9:
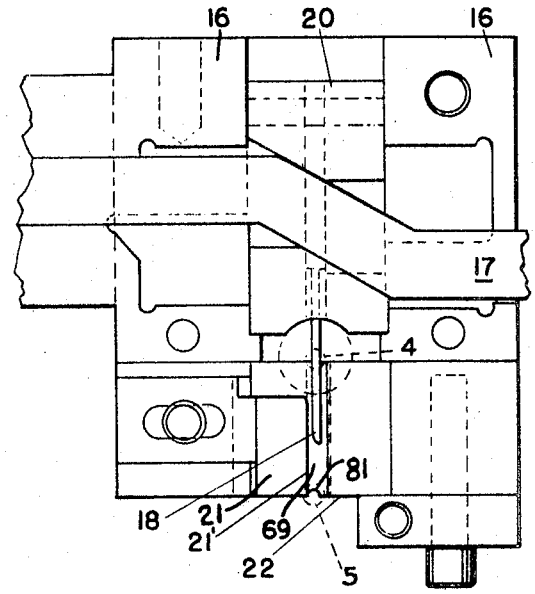
FIG. 9 is a top view of the bead loader similar to the view shown in FIG. 2.

As the table continues to index, the beaded leads are, in turn, brought past the burners 57 and 58 where the beads are preheated by the burners. The beaded leads are then raised up at the pushup station 54 so that the bead is spaced above the table as shown in FIG. 5. The beaded leads are spaced in front of the flames so that the flames will not heat the chuck. The beads are then hermetically sealed to the wires by oxygen supported flames from burners 62. The bead 61 is thus hermetically sealed to the wire 55 by the burners and as the table continues to index, the beaded wire is brought in front of the pickoff station 63 shown in FIG. 6. The pickoff arm 53 then rotates to a position adjacent the wire and the wire is forced into notch 67 so that the fork 70 straddles the wire and is supported under the bead. The pickoff arm 53 is then moved by the cam 71 under the table 50 and lifts the beaded lead from the table and deposits it into a suitable receptacle.

The foregoing specification sets forth the invention in its preferred practical forms but the structure shown is capable of modification within a range of equivalents without departing from the invention which is to be understood is broadly novel as in commensurate with the appended claims.

The embodiments of the invention in which an exclusive property or privilege is claimed are defined as follows:

1. A bead loader comprising
   a chute for feeding beads,
   a platform adjacent said chute adapted to receive beads from said chute,
   a notch in said platform at one side thereof,
   plunger means movable over said platform for moving said beads from said chute over said platform to bring said beads over said notch,
   means to move wires through said notch into said beads,
   and means to move each said beads and wire laterally from said notch and from said loader with a said bead thereon.
2. In combination, a bead loader and a turret,
   said turret having spaced means thereon to receive lengths of wire,
   means to rotate said turret in a plane,
   said bead loader being supported adjacent said turret,
   said bead loader having a platform supported adjacent said turret,
   a notch in said platform,
   feeding means to feed beads onto said platform,
   plunger means to move individual beads over said platform to bring the hole in each said bead in turn to position overlying said notch,
   means to move said wire in said spaced means to bring said wire into said notch and through said bead,
   and an opening in the side of said bead loader to allow said bead and said wire to move from said notch and from said bead loader with said bead on said wire.
3. In combination, a bead loader and a turret,
   said turret having spaced chucks,
   means to feed cut lengths of wire into said chucks,
   said bead loader having a platform supported adjacent said turret in spaced relation thereto,
   a tube for containing beads, each having a hole opening toward said turret,
   means to feed said beads into said tube,
   said tube terminating in spaced relation to said platform a distance slightly greater than the dimension of said beads in the direction of said hole therethrough,
   a notch in said platform,
   plunger means to move a said bead over said platform from said tube to a position with said hole in said bead overlying said notch,
   means to index said turret to bring each said chuck in sequence under said notch,
   means to move each of said wires up in sequence through said notch and into the hole in said bead,
   and means to index said turret to move said bead with said wire in said hole out of said bead loader.
4. The combination recited in claim 3 wherein
   means is provided on said machine to attach said beads to said wires after said beads move from said bead loader,
   and means is provided on said turret to remove said wires with said beads thereon from said chucks.
5. The combination recited in claim 3 wherein
   said plunger means comprises a shuttle block having said plunger means attached thereto,
   said shuttle block being fixed to said plunger means,
   a sliding cam engaging said shuttle block,
   and means synchronizing said shuttle block with the indexing movement of said wires toward said platform whereby a said bead is moved over said notch just prior to the movement of a said wire toward said platform.
6. The combination recited in claim 5 wherein
   said bead loader is supported above said turret.
7. A bead loader comprising
   a platform,
   a tube supported above said platform,
   a shuttle block slidably supported on said bead loader,
   a notch in one side of said platform extending generally in the direction of said tube,
   and means to move beads from said tube individually from under said tube to a position over said notch.
8. A bead loader comprising
   a platform,
   loading means to support a column of beads with the lowermost of said beads resting on said platform,
   means to move a wire into the hole in said lowermost bead,
   and means to move said wire with said bead from under said column of beads to a position remote from said bead loader,
   said column of beads being adpted to move downwardly when said lowermost bead is removed whereby the bead next above said first mentioned lowermost bead rests on said platform.
9. The bead loader recited in claim 8 wherein
   a plunger member is provided on said bead loader to move said lowermost bead from under said column of beads prior to the time said wire is moved thereinto.

References Cited

UNITED STATES PATENTS

| | | | |
|---|---|---|---|
| 1,941,992 | 1/1934 | Makenny | 29—208 |
| 3,052,969 | 9/1962 | Loven | 29—211 |
| 3,124,861 | 3/1964 | Cropp | 29—25.3 |

JOHN F. CAMPBELL, Primary Examiner

D. C. REILEY, Assistant Examiner

U.S. Cl. X.R.

29—208, 211, 569; 69—139